DATA TRANSFER SYSTEM

Filed July 31, 1969

INVENTORS
PERRY W. PENTON
RICHARD T. FLYNN
BY
James A. Perehon
AGENT 3,553,657
DATA TRANSFER SYSTEM
Perry Wayne Penton and Richard Thomas Flynn, Phoenix, Ariz., assignors to General Electric Company, a corporation of New York
Filed July 31, 1969, Ser. No. 846,321
Int. Cl. G06f 3/00; H04l 1/00
U.S. Cl. 340—172.5 14 Claims

ABSTRACT OF THE DISCLOSURE

A data transfer system for preventing the loss of data items tranferred from a plurality of data sources to a user device due to non-stable clock signal. The system includes a buffer store for receiving the data items and a clock signal level detector for selectively transferring the data items into and out of the buffer store in response to the level detector and to a request signal from the user device.

BACKGROUND OF THE INVENTION

The present invention relates generally to data transfer systems and more particularly to an apparatus within a data transfer system for buffering items of serialized data received from a plurality of data sources for subsequent transfer into a user device or devices.

Field of the invention

In the data transfer systems of the type wherein information is transferred from a data source to a user device in serialized form, it is usually necessary to store or buffer bits of information transmitted by the data source for subsequent transfer into the user device. This buffering is normally accomplished by a type of receiver device which is intermediate the data source and the user device. One of the primary functions of the receiver device is to synchronize the data being transmitted by the data source with the clock system of the user device. This synchronization is automatically provided by a clock signal which is transmitted in synchronization with the data bits from the data source. The clock signal is utilized by the receiver device to clock the data bits into a temporary buffer storage device for subsequent transfer from the receiver device to the user device.

Description of the prior art

Data transfer systems most prevalent in the art are comprised of a plurality of remote data sources which transmit serialized digital data to a user device or devices through a suitable receiver buffer logic. The line discipline or information signal lines from the data sources to the buffer logic normally consist of a data line for transmitting the serialized data and an associated clock line for transmitting, ideally, a symmetrical clock signal which is utilized in the receiver logic for clocking the receive data into the receiver buffer logic.

The most prevalent philosophy in the prior art is to provide a receiver logic which utilizes a transition (rising or falling edge) of each cycle of the clock signal to interrogate or strobe the receive data from the data source into a bit buffer in the receiver logic. These prior art systems go on the assumption that the transitional change of the receive clock, utilized in the receiver logic, occurs at approximately the center of the bit duration of a receive data bit from the data source. However, those systems making direct use of the transition of the receive clock to strobe data bits into the bit buffer must generate a sample timing pulse to transfer the data out of the bit buffer into the user devices. The rate of this sample pulse is dictated by the minimum time interval between two consecutive transitions of the receive clock. This minimum time interval between transitions is a function of the frequency of the receive clock from the data source and various perturbations in the system which upset the symmetry of the clock signal. These perturbations normally set up a fluctuation of the clock signal commonly referred to as jitter. This jitter could be generated, for example, in the data source by a one-shot multivibrator of which the rising edge is triggered by an accurate time base. However, the one-shot being an unstable device generates an unstable falling edge which would then provide a variable falling edge pulse on the receive clock line transferred from the data source to the receiver logic. Other contributing factors which could contribute to the jitter on the receive clock would be things such as capacitance in the receive line, cross-talk in the lines, and noise generated by external sources.

This jitter causes the transitional edge of the receive clock utilized by the receiver logic to effectively move back and forth in a fluctuating manner; thus, it is difficult to ascertain at which time during each cycle of the clock signal a transition will take place. Because of this jitter, the sample rate for sampling the receive data by the user devices must be much faster than the nominal data transmit or clock signal rates. If this sampling rate is not fast enough and excessive jitter exists in the receive clock signal, there is the possibility of the loss of receive data bits from the data source. Further, the sampling rate of the prior art system poses a heavy load on the user device in that it must be fast enough to compensate for the jitter in the receive clock while still being capable of servicing the plurality of remote data sources.

SUMMARY OF THE INVENTION

The present invention alleviates this problem of the prior art by providing a plurality of receiver logics or a logic which permits a user device or devices to sample data items received from a plurality of data sources or a source at a sample rate which is dictated by the nominal data transfer rate of the data being transmitted by each data source. Each of the receiver logic functions includes a receiver means for receiving serialized data bits or items transmitted by associated ones of the data sources. In addition, the data transmitted from each of the data sources to the receiver logic has associated with it a receive clock line. The receive clock line provides an alternating receive clock signal having first and second levels in synchronization with the receive data for clocking data items into the receiver logic. Each receiver logic further provides means for transferring the data items received into a user device which samples the receiver logic.

As previously described, one of the problems in prior art systems is the loss of data due to noise or jitter in the receive clock signal when the data is being transferred from a data source into a receiver logic. The present invention eliminates this problem of losing data by incorporating a suitable differentiator or detector means which makes use of the receive clock signal to generate a strobe signal at a proper time with respect to individually received data items for strobing data items into the receiver means. The receiver logic also provides a flag means for indicating that data items have been received and for further indicating that a data item has not been transferred therefrom to a user device. This flag means also provides an indication to direct the receiver logic to use the receive clock signal to strobe in new receive data items from the data source or to inhibit the strobing of a new data item into the receiver means until the last received data item has been transferred to the user device. This inhibiting of the strobing of data items makes the receiver logic self-adjusting to the extent that no data items will be lost. Thus, the receiver logic contains means to prevent the loss of received data by automatically adjusting to or recovering from variations in the symmetry of a receive clock signal.

It is therefore an object of the present invention to provide a receiver device for utilization in a data transfer system having enhanced data transfer capabilities.

Another object is to provide an information transfer system including a plurality of receiver logic devices providing the capability of transferring data items from a plurality of data sources to a user device without losing data items.

Still another object is to provide a receiver logic for utilization in an information transfer system capable of automatically adjusting to variations in a receive clock signal received from a data source to prevent the loss of data items being transferred from the data source to a user device.

Still a further object is to provide a plurality of receiver logics intermediate plurality of user devices and a plurality of data sources for synchronizing the transfer of information items received from the data sources to the plurality of user devices.

Still another object is to provide an apparatus in a data transfer system for preventing the loss of data items transferred from an external source to a user device.

The foregoing and other objects will become apparent as this description proceeds and the features of novelty which characterize the invention will be pointed out in particularity in the claims annexed to and forming a part of this specification.

BRIEF DESCRIPTION OF THE DRAWING

The present invention may be more readily described and understood by reference to the accompanying drawing in which.

DESCRIPTION OF THE PREFERRED EMBODIMENT

Figure 1:
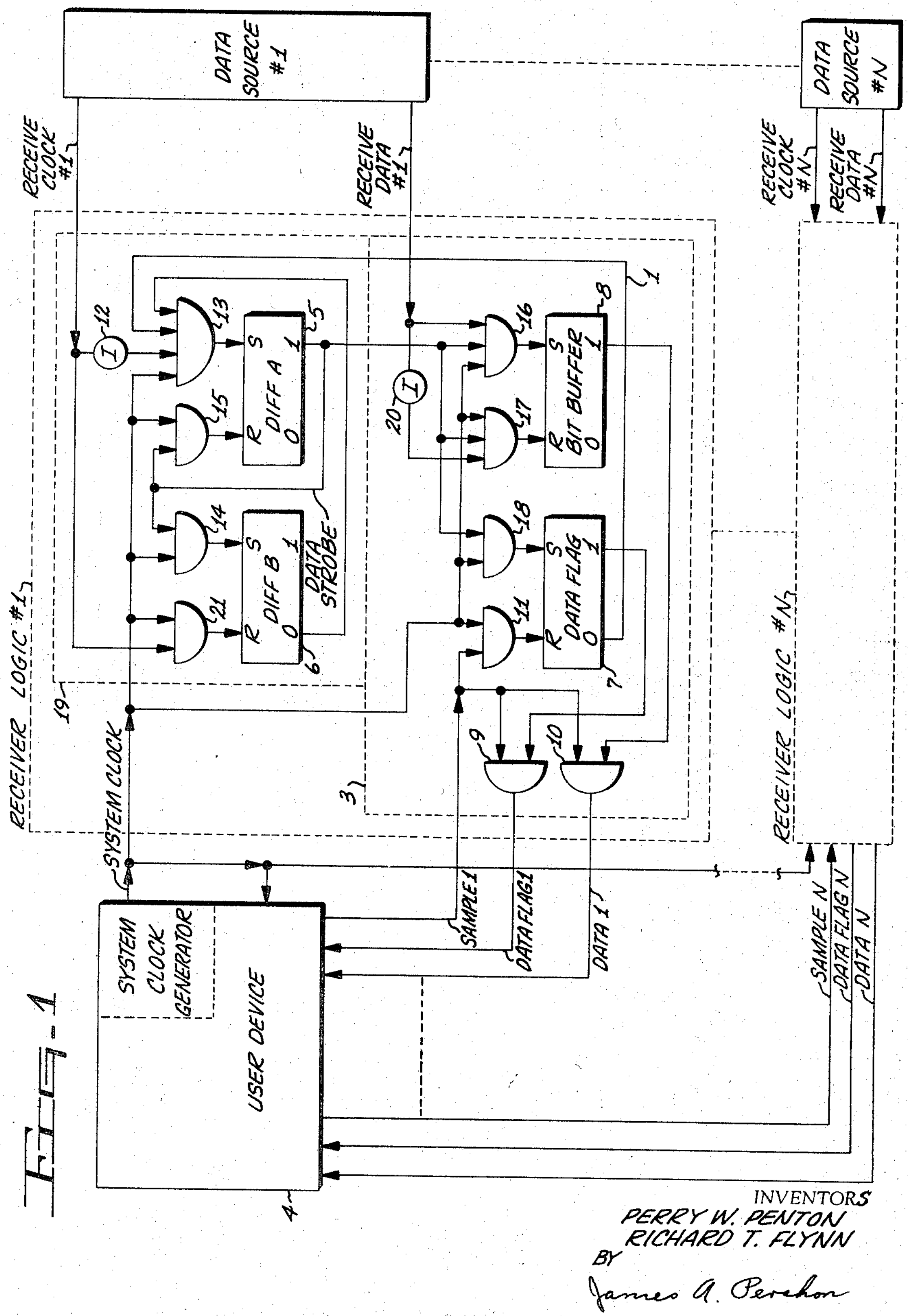
FIG. 1 is a schematic block diagram illustrating an information transfer system embodying the present invention.

Referring now to FIG. 1 there is shown a plurality of identical Receiver Logics designated Receiver Logic #1 through Receiver Logic #N, of which only Receiver Logic #1 is shown in detail.

The Receiver Logics are designed to receive serialized data items from a corresponding one of a plurality of Data Sources designated Data Source #1 through Data Source #N. The Data Sources are each of a type which generate an alternating receive clock signal. The receive clock signal makes repetitive transitions from a first level to a second level and from the second level to the first level, etc. The Data Sources also generate a receive data signal in such a fashion that each data item generated by the Data Sources is generated on a rising edge or a first or low level to a second or high level transition of the receive clock signal so that each data item is synchronized with the receive clock.

The Receiver Logics are designed to detect each data item received from an associated Data Source on the first level or after the falling edge of the receive clock. If the receive clock signal is ideally symmetrical the falling edge will occur, in relationship to a corresponding data item or bit, at the center point of the data item. Upon detecting the first or low level after the falling edge of the receive clock the Receiver Logic will strobe the receive data item from an associated Data Source into the logic for subsequent synchronized transfer to a User Device 4.

The User Device 4 may be a single device or a plurality of devices adapted to generate a plurality of sample signals designated Sample 1 through Sample N, which are provided to respective ones of the Receiver Logics #1 to #N. The Sample signals request or enable each of the Receiver Logics to transfer a last or previously received data item from the respective receiver logics to the User Device 4 via a one of a plurality of data lines designated DATA 1 through DATA N. The Sample signals 1–N also cause a Data Flag signal to be applied to the User Device 4 via selected ones of data lines DATA FLAG 1 through DATA FLAG N each time a Receiver Logic transfers a data item to the User Device. User Device 4 also generates a system clock signal which is applied to each of the Receiver Logics to control the setting and resetting of various bistable devices or flip-flops within the Receiver Logics. The system clock signal is a repetitive signal which runs at a relatively high frequency. A typical frequency being in the vicinity of four megacycles.

Figure 2:
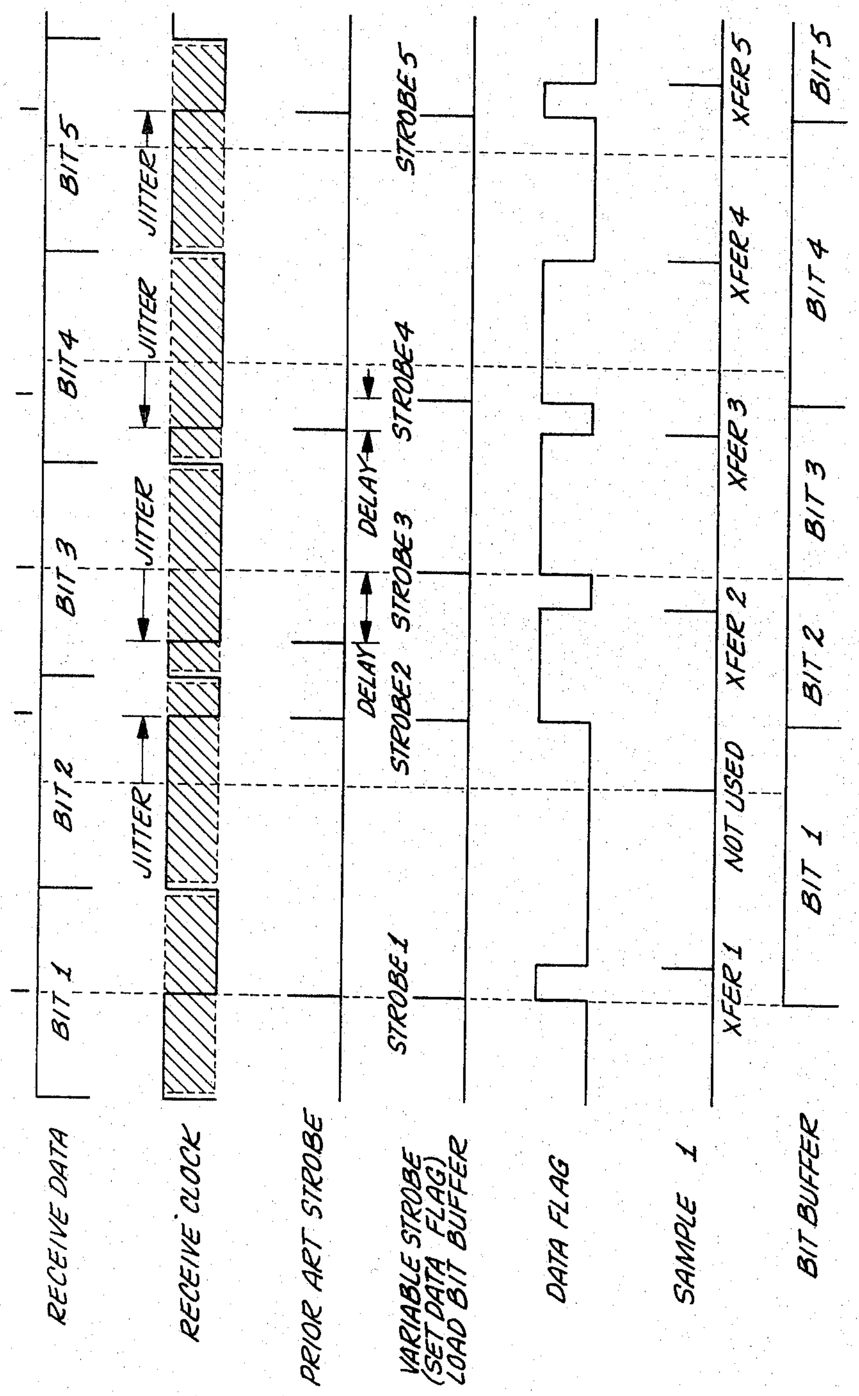
FIG. 2 is a timing diagram illustrating the sequence of operation of the present invention of FIG. 1.

In the subsequent discussion only the operation of Receiver Logic #1 of FIG. 1 will be described since the functional operation and design of each of the Receiver Logics is identical. However in preparation to proceeding with the description of Receiver Logic #1, the timing diagram of FIG. 2 will be briefly described. FIG. 2 shows a receive data format of five data items or bits in segments labeled Bit 1–Bit 5. Directly below the receive data the receive clock signal is illustrated showing its relationship to the data Bits 1–5. It will be noted that each data bit, which may be either a binary 1 or a binary 0, spans one complete cycle or two transitions of the receive clock. That is, each bit starts on a leading or rising edge and ends on the next succeeding rising edge of the receive clock signal. The receive clock shown in FIG. 2 associated with Bit 1 is considered to be an ideal condition for the receive clock, where the falling edge of the signal is in a nominal or center position with respect to Bit 1.

As previously described, the receive clock signal generated by the data source is utilized by the Receiver Logic to strobe a new receive data item from the receive data line into the Receiver Logic. The falling edge of the receive clock is normally used by the Receiver Logic as an indication that the center portion of the receive data bit appears on the receive data line at the input to the Receiver Logic #1. Therefore, as shown in FIG. 2, at the time of the negative transition of the receive clock, the receive data bit (Bit 1) is in a stable state so that it may be strobed into the Receiver Logic #1. This is indicated by a variable strobe line of FIG. 2 shown as Strobe 1 signal.

Theoretically, the falling edge of the receive clock normally falls in the center position of the receive data bit. However, experience and practice have found that the receive clock signal has a tendency to experience considerable fluctuation or jitter on the falling edge of the receive clock, thus changing the falling edge of the receive clock from its nominal center position to a plus or minus position in relation to the center of the receive data bit.

As shown in FIG. 2, the receive clock signal makes a negative transition at a point in either a plus direction going to the right or in a minus direction going to the left with respect to the center position of Bits 2–5. This plus and minus direction with respect to the center positions of Bits 2–5 is shown by an arrow and the descriptive word jitter. The jitter can occur in a plus and minus direction for two consecutive data bits, as illustrated in relation to Bits 2 and 3. When this situation occurs, the time between falling edges of the receive clock signal is considerably less than the time between falling edges in a symmetrical receive clock signal. Thus it is possible to lose Bit 2 unless the User Device can sample data Bit 2 before the falling edge of the receive clock signal associated with Bit 3 appears. The manner in which the present invention eliminates this possibility of data loss will be described later.

For comparison purposes, FIG. 2 shows a prior art strobe line which indicates that a system of the prior art strobes each receive data bit into the Receiver Logic upon the occurrence of each falling edge of the receive clock. In connection with Bits 2 and 3, for example, when two strobe signals are generated as shown in the prior art strobe signal, a restriction is imposed on the prior art system. The User Device is required to sample each Receiver Logic between the falling edges of the receive clock to prevent the loss of a data item. Therefore the short time available between the adjacent strobe signals imposes a serious restriction on the number of receiver logics that the User Device is capable of servicing prior to this invention.

The present invention compensates for this jitter problem while simultaneously allowing the User Device 4 to sample the Receiver Logics at a rate determined by the actual bit rate of the receive data, which rate is determined by the frequency of the occurrence of the rising edge of the receive clock signal.

In describing the operational sequence of the present invention reference is now made to a differentiator or detector means 19 of FIG. 1 where the following should be assumed. A generating means differentiator, Diff A flip-flop 5, and a conditioning means differentiator, Diff B flip-flop 6, are in a reset state. A sensing means and flag generator, Data Flag flip-flop 7, and a storage means, Bit Buffer flip-flop 8, of receiver means 3 are also in a reset state. It should also be assumed that Data Source #1 is not providing a receive clock signal or receive data to the Receiver Logic #1, that the User Device 4 is generating the system clock and is providing the Sample 1 signal to the Receiver Logic #1.

Referring to FIGS. 1 and 2, Sample 1 signal is applied scimultaneously to three AND-gates 9, 10 and 11 of the receiver means 3. This Sample 1 signal, as shown in FIG. 2, is applied to the Receiver Logic #1 at a rate faster than the nominal data transfer rate; that is, rising edge to rising edge of the receive clock signal. At this time, data will not be transferred to the User Device 4 since AND-gates 9 and 10 respectively are disabled by a binary 0 signal applied thereto from a 1 output terminal of the Data Flag flip-flop 7 and from a 1 output terminal of Bit Buffer flip-flop 8.

Assume now that Data Source #1 begins to generate the receive clock signal and data items. When the first receive clock signal corresponding to Bit 1 makes a negative transition from its second level to its first level, a binary 1 signal is applied to an enabling means, AND-gate 13, via an Inverter 12. The Data Flag flip-flop 7, which serves as a sensing means, is in a reset state providing a binary 1 signal on a sensing signal lead 1 from a 0 output terminal to logic AND-gate 13. Also differentiating bistable Diff B, being in a reset or first state, is applying a binary 1 signal from a 0 output terminal to AND-gate 13. Thus upon the occurrence of a system clock signal, AND-gate 13 will develop a binary 1 set signal which is applied to an S terminal of the generating means Diff A flip-flop 5 placing the flip-flop in a set state.

The Diff A flip-flop, upon achieving a set state, generates a binary 1 output signal from its 1 output terminal. This binary 1 signal, designated Data Strobe, is applied to an AND-gate 14, which in turn applies a binary 1 set signal to an S terminal of the Diff B flip-flop, upon the occurrence of the system clock signal. The setting of Diff B flip-flop disables AND-gate 13 which prevents the setting of Diff A flip-flop. The Data Strobe signal is simultaneously applied to an AND-gate 15 to enable AND-gate 15 which applies a binary 1 reset signal to an R terminal of the Diff A flip-flop thereby resetting it. Thus, the Diff A flip-flop will remain in a set state for only one system clock period. In effect the Diff A flip-flop has now detected the first level after the falling edge of the receive clock signal.

The binary 1 Strobe signal from the Diff A flip-flop is applied simultaneously to three AND-gates 16, 17 and 18 of the receiver means 3. AND-gate 18 is enabled by the system clock signal to apply a binary 1 set signal to an S terminal of the Data Flag flip-flop 7, thus placing the Data Flag flip-flop 7 in a set state to indicate that data Bit 1 is presently being strobed into the Bit Buffer flip-flop 8.

Referring now to the Bit Buffer flip-flop 8, the receive data Bit 1 from Data Source #1 is applied to input means AND-gate 16 and via an Inverter 20 to input means AND-gate 17. If at this time receive data Bit 1 from Data Source #1 is a binary 1, upon the application of the system clock signal to AND-gate 16 the gate will be enabled to provide a set signal to an S terminal of the Bit Buffer flip-flop, thus allowing a binary 1 data bit to be strobed into the Bit Buffer 8. However, assuming that receive data Bit 1 is a binary 0, the binary 0 signal will be inverted through Inverter 20 to apply a binary 1 signal to AND-gate 17, which in turn will provide a binary 1 reset signal to an R terminal of the Bit Buffer flip-flop, thus keeping the Bit Buffer 8 in a reset state. If the Bit Buffer 8 had been in a set state the binary 1 signal from AND-gate 17 would cause the Bit Buffer to reset, thus allowing a binary 0 data bit to be strobed into the buffer.

At this point in time, the Diff A flip-flop, upon detecting the low level of the receive clock, has strobed data Bit 1 into the Bit Buffer flip-flop 8 and set the Data Flag flip-flop 7, indicating that the Receiver Logic now contains receive data Bit 1 from Data Source #1.

Referring now to AND-gates 9 and 10, the Data Flag flip-flop is applying a binary 1 signal to AND-gate 9, and the Buffer flip-flop 8 is applying either a binary 1 or binary 0 signal to AND-gate 10 from its 1 output terminal. If the Buffer flip-flop is in a set state storing a binary 1, the signal applied to AND-gate 10 will be a binary 1, however, if it is in a reset state storing a binary 0, the signal applied to AND-gate 10 will be a binary 0. The two AND-gates 9 and 10 also receive the Sample 1 signal from User Device 4. When User Device 4 generates the Sample 1 signal, AND-gate 9 will be enabled to generate a binary 1 Data Flag 1 signal which is applied to the User Device. At this same time the contents of the Bit Buffer flip-flop 8 will be transferred to the User Device 4. In this manner data Bit 1 is transferred from the Receiver Logic #1 into the User Device 4.

Referring to the Sample 1 signal line, it will also be noted that at the same time the data is transferred into the User Device, the Sample 1 signal is applied to an AND-gate 11. Thus, AND-gate 11, upon the occurrence of the Sample 1 signal and the system clock signal, will generate a binary 1 reset signal which is applied to an R terminal of the Data Flag flip-flop 7. The Data Flag flip-flop will reset and apply a binary 0 disable signal from its 1 output terminal to AND-gate 9, thereby removing the Data Flag 1 signal from User Device 4. The Data Flag flip-flop 7 applies a binary 1 enable or sensing signal from its 0 output terminal via sensing line 1 to the input of AND-gate 13.

Referring to the conditioning means Diff B flip-flop 6, when the receive clock signal associated with Bit 2 (FIG. 2) goes from the first level to the second level, and AND-gate 21 will be enabled. AND-gate 21 applies a binary 1 reset or conditioning signal to an R terminal of the conditioning flip-flop Diff B. Since the receive clock signal is at a second or high level, the input to AND-gate 13, via Inverter 12, will disable AND-gate 13. This will prevent the Diff A flip-flop from setting again until the first level of the receive clock signal is detected at the input of Inverter 12 of detector 19. AND-gate 13 is now conditioned to be enabled via Inverter 12 upon the next transition of the receive clock signal from a second to a first level.

Referring now to FIG. 2, in summary it will be noted in connection with Bit 1, that the receive clock signal is shown making a transition from the second level to the first level in the nominal or center position of Bit 1. Also, the Data Flag flip-flop 7 was set by Strobe 1 at the time of the falling edge of the receive clock and it was reset by the Sample 1 signal from User Device 4. In addition it is shown that the data Bit 1 was strobed into the Bit Buffer 8 at Strobe 1 time and subsequently data Bit 1 was transferred to the User Device 4 by the Sample 1 signal, XFER 1, which reset the Data Flag flip-flop 7.

So long as no jitter occurs in the receiver clock signal, the sequence just described will be repeated each time the receive clock goes through a negative transition, in that, the Data Flag flip-flop 7 will always be reset prior to the next negative transition of the receive clock. This is due to the fact that the Sample 1 signal occurs at a faster rate than the receive data rate. However when the receive clock exhibits jitter in a plus direction as shown in the example in connection with the Receive Data Bit 2, the generation of the variable strobe will be at a different time than under ideal clock signal conditions. In the example of Bit 2, the receive clock signal goes through a negative transition at some point in time later than the normal center position of Data Bit 2.

The manner in which the strobe signal is delayed is explained as follows. Assume that data Bit 1 has been transferred to User Device 4 and that data Bit 2 is now present at the input of receiver means 3 (FIG. 1). Conditions in the Receiver Logic are as shown in FIG. 2 with the Data Flag flip-flop in a reset state and the receive clock signal has made a transition from a first level to a second level to allow AND-gate 21 to apply a binary 1 reset signal to the Diff B flip-flop 6. As shown in FIG. 1, these conditions will allow AND-gate 13 to be enabled by the system clock signal after the receive clock signal makes a transition from the second level to the first level.

It will be recalled that the Data Flag flip-flop 7 can only be set upon the generation of the Data Strobe signal from the Diff A flip-flop 5. As shown in FIG. 2, signal Strobe 2 for Bit 2 occurs after the second Sample 1 signal from User Device 4. The Sample 1 signal, designated not used, has no affect on the operation of the Data Flag flip-flop 7 since the Data Flag flip-flop is already reset.

With the conditions established as described above for Bit 2 when the receive clock signal goes from the second level to the first level, AND-gate 13 will be enabled via Inverter 12. The Diff A flip-flop 5 will set and the Strobe 2 signal will be generated in the same manner as previously described for the Strobe 1 signal. As shown in FIG. 2, data Bit 2 is strobed into the Bit Buffer 8 and simultaneously the Data Flag flip-flop 7 is placed in a set state.

The Receiver Logic #1 is now in a condition to be sampled by the User Device 4 for the transfer of Bit 2 from the Bit Buffer to the User Device. The Sample 1 signal designated XFER 2 is applied to AND-gates 9, 10 and 11. Thus the Data Flag 1 signal is generated and Data Bit 2 is transferred to the User Device, and the Data Flag flip-flop is reset.

It is significant to note that the receive clock signal in relation to Bit 3 makes a positive and a negative transition before the third Sample 1 signal, XFER 2, transfers Bit 2 from the Bit Buffer flip-flop to the User Device. However, it should further be noted that no data is lost since the Strobe 3 signal is not generated until after the transfer of Bit 2 to the User Device.

There are three primary conditions which must be met before the Diff A flip-flop 5 can generate a Data Strobe signal. These conditions are: the Diff B and Data Flag flip-flops must be in a reset state, and the receive clock signal must be at a low or first level. As shown in FIG. 2 all of these conditions are not present at the time the Sample 1 signal, XFER 2, transfers Bit 2 to the User Device since the Data Flag flip-flop 7 is in a set state.

Referring again to FIGS. 1 and 2, the Diff B flip-flop 6 resets via AND-gate 21 whenever the receive clock signal goes to the second or high level. This occurs when Bit 3 appears at the input to the receiver means 3. Thus, the Diff B flip-flop 6 will apply a binary 1 signal to the input of AND-gate 13 from its 0 output terminal. The clock signal associated with Bit 3 achieves the first level at a time minus the center point of Bit 3 causing Inverter 12 to apply a binary 1 signal to AND-gate 13.

When the Sample 1 signal, XFER 2, transfers Bit 2 to the User Device, the Data Flag flip-flop 7 is reset via AND-gate 11. The transfer of Bit 2 in effect provides a binary 1 signal from the 0 output terminal of Data Flag flip-flop 7 to the input of AND-gate 13. Thus, the three primary conditions are met, and AND-gate 13 will be enabled on the occurrence of the system clock signal. The enabling of AND-gate 13 causes the Diff A flip-flop to generate the delayed Strobe 3 signal which strobes Bit 3 into the Bit Buffer flip-flop 8 as previously described.

It is worthy to point out that prior art systems would have used the negative transition of the receive clock signal associated with Bit 3, as shown by the prior art strobe signal, to strobe Bit 3 into the Bit Buffer, thereby destroying Bit 2 before transfer to the User Device. The present invention however prevents the loss of Bit 2 by utilizing the sensing means signal from the 0 output terminal of the Data Flag flip-flop 7 to delay the generation of the Data Strobe signal until Bit 2 has been sampled by the User Device and transferred thereto by the Sample 1 signal.

The operation of the present invention has been described showing that the Receiver Logic can recover from a receive clock signal jitter condition. A worse case jitter condition occurring for two consecutive data items has been described in the transfer of Bits 2 and 3 to show the error-free transfer of data under the most adverse receive clock signal conditions.

The timing of the operations of the Receiver Logic #1 for strobing two other data Bits, data Bits 4 and 5, into the Bit Buffer and for transferring the data Bits into the User Device is shown in FIG. 2. The receive clock signal in connection with Bit 4 goes through a negative transition at a time minus to normal, and the receive clock signal in connection with Bit 5 goes negative at a plus time to normal. These two conditions are shown as further examples to indicate various conditions under which the Receiver Logic may recover from the abnormal jitter condition and thus prevent the loss of receive data bits from the data source.

While the principles of the invention have now been made clear in an illustrative embodiment, there will be immediately obvious to those skilled in the art many modifications of structure, arrangement, proportions, the elements, materials, and components used in the practice of the invention, and otherwise, which are particularly adapted for specific environments and operating requirements without departing from those principles. The appended claims are therefore intended to cover and embrace any such modifications within the limits only of the true spirit and scope of the invention.

What is claimed is:

1. A data transfer system comprising:
- a data source for generating consecutive data items and a clock signal having a first level and a second level;
- a user device for requesting data items;
- receiver means intermediate said data source and said user device for receiving said data items from said data source in response to a strobe signal, and for transferring said data items to said user device at the request of said user device; and
- a detector means conditioned by said second level of said clock signal;
- said detector means generating said strobe signal in response to said first level of said clock signal after said receiver means transfers a received data item to said user device, said strobe signal transferring a consecutive data item into said receiver means.

2. The data transfer system of claim 1 wherein the receiver means includes:
- a storage means for storing said data items in response to said strobe signal; and a flag generator for providing a flag signal for signalling said user device of the presence of a data item in said storage means and for enabling a sensing signal after the transfer of a previously received data item from said storage means to said user device.

3. The data transfer system of claim 1 wherein the detector means includes:

conditioning means enabled by said second level of said clock signal;

enabling means conjunctively responsive to said receiver means transferring said data items to said user device, said conditioning means, and said first level of said clock signal; and generating means responsive to said enabling means for generating said strobe signal.

4. The data transfer system of claim 1 wherein the receiver means comprises:

a first bistable enabled by said strobe signal for storing a data item; and a second bistable achieving a set state in response to said strobe signal for signalling said user device of the presence of a data item in said first bistable and achieving a reset state in response to the request of said user device enabling the transfer of the data item stored in said first bistable device for signalling said detector of the transfer of the previously received data item.

5. The data transfer system of claim 1 wherein the detector means comprises:

a first differentiating bistable achieving a first state in response to said second level of said clock signal and achieving a second state in response to said strobe signal;

a logic gate conjunctively responsive to said first state of said first differentiating bistable, said first level of said clock signal, and to said receiver means transferring said data items to said user device; and a second differentiating bistable responsive to said logic gate to generate said strobe signal.

6. A data transfer system to prevent the loss of data items transferred between a data source and a requesting user device comprising:

receiver means intermediate said data source and said user device for receiving a data item from said data source in response to a strobe signal, said receiver means transferring said data item to said user device at the request of said user device;

a detector means for receiving a clock signal from said data source, said clock signal having a first level and a second level;

said detector means achieving a conditioning state in response to said second level of said clock signal for generating a strobe signal in response to said first level of said clock signal and to said receiver means transferring a previously received data item.

7. The data transfer system of claim 6 wherein the receiver means includes:

a storage means for storing said data item in response to said strobe signal; and a flag generator for providing a flag signal for signalling said user device of the presence of a data item in said storage means and for enabling a sensing signal after the transfer of a previously received data item from said storage means to said user device.

8. The data transfer system of claim 6 wherein the detector means includes:

conditioning means enabled by the second level of said clock signal;

enabling means conjunctively responsive to said receiver means transferring said data items to said user device, said conditioning means, and the first level of said clock signal; nad generating means responsive to said enabling means for generating said strobe signal.

9. The data transfer system of claim 6 wherein the receiver means comprises:

a first bistable device enabled by said strobe signal for storing a data item; and a second bistable achieving a set state in response to said strobe signal for signalling said user device of the presence of a data item in said first bistable and achieving a reset state in response to the request of said user device enabling the transfer of said data item stored in said first bistable device for signalling said detector of the transfer of the previously received data item.

10. The data transfer system of claim 6 wherein the detector means comprises:

a first differentiating bistable achieving a first state in response to said second level of the clock signal and achieving a second state in response to said strobe signal;

a logic gate conjunctively responsive to said first state of said first differentiating bistable, said first level of said clock signal, and to said receiver means transferring said data items to said user device; and a second differentiating bistable responsive to said logic gate to generate said strobe signal.

11. Apparatus for generating a variable strobe signal to effect a transfer of data items from a data source to a storage means, said data source generating a clock signal having a first level and a second level, said apparatus comprising:

a flag generator for providing a flag signal for signalling a user device of the presence of a data item in said storage means and for enabling a sensing signal after the transfer of a data item from said storage means to said user device;

a conditioning means responsive to said second level of said clock signal;

an enabling means conjunctively responsive to said sensing signal, said first level of said clock signal, and to said conditioning means; and generating means responsive to said enabling means for generating said variable strobe signal.

12. A data transfer system comprising:

a data source for generating consecutive data items and a clock signal having a first level and a second level;

a user device for generating a sample signal to effect a transfer of said data items to said user device; and means intermediate said data source and said user device for transferring said data items between said data source and said user device;

said means comprising:

input means enabled by a strobe signal for receiving said data items;

a storage means coupled to said input means for consecutively storing said data items;

a flag generator for providing a flag signal in response to said strobe signal for signalling said user device of the presence of a data item in said storage means and for generating a sensing signal in response to said sample signal;

conditioning means responsive to said second level of said clock signal;

enabling means conjunctively responsive to said sensing signal, said conditioning means, and to said first level of said clock signal; and generating means responsive to said enabling means for generating said strobe signal.

13. In a data transfer system of the type having a data source for generating data items and a clock signal, a user device for generating a sample signal to effect a transfer of said data items to said user device, and an intermediate apparatus for effecting the transfer of data items from said data source to said user device, said intermediate apparatus including a storage means to store said data items, a data flag generator for signalling the user device of the presence of a data item stored in said storage means and a generating means for generating a strobe signal for transferring said data items from said data source into said storage means, the improvement comprising:

conditioning means coupled to receive said clock signal and responsive to a level of said clock signal;

said data flag generator generating a sensing signal in response to said sample signal; and enabling means conjunctively responsive to said sensing signal, to said conditioning means, and to another level of said clock signal, for enabling said generating means to generate said strobe signal.

14. A data transfer system comprising:

a data source for generating data items in serial form and a clock signal timed to said data items;

a user device for generating a sample signal; and intermediate means connecting said data source to said user device to effect a transfer of said data items from said data source to said user device;

said intermediate means comprising:

a first AND-gate and a second AND-gate each having one input responsive to individual ones of said data items and another input responsive to a strobe signal;

a first bistable responsive to said first and second AND-gates for storing a data item;

a second bistable achieving a first state in response to said strobe signal for signalling said user device of the presence of said data item in said first bistable and achieving a second state in response to said sample signal;

a third bistable achieving a first state in response to a level of said clock signal and achieving a second state in response to said strobe signal;

a third AND-gate conjunctively responsive to said first state of said third bistable, another level of said clock signal, and said second state of said second bistable; and a fourth bistable responsive to said third AND-gate to generate said strobe signal.

References Cited

UNITED STATES PATENTS

| | | | |
|---|---|---|---|
| 3,188,484 | 6/1965 | Jorgensen | 328—63X |
| 3,281,527 | 10/1966 | Davis et al. | 340—172.5X |
| 3,320,539 | 5/1967 | Rodner | 328—63X |
| 3,328,766 | 6/1967 | Burns et al. | 340—172.5 |
| 3,381,284 | 4/1968 | Riley | 340—174.1 |
| 3,394,355 | 7/1968 | Sliwkowski | 340—172.5 |
| 3,395,391 | 7/1968 | Gorog et al. | 340—172.5 |

PAUL J. HENON, Primary Examiner

R. F. CHAPURAN, Assistant Examiner